United States Patent [19]

Hughes

[11] 4,132,955
[45] * Jan. 2, 1979

[54] SYSTEM FOR AMPLIFYING LASER BEAMS

[75] Inventor: John L. Hughes, Aranda, Australia

[73] Assignee: Helen Hughes, Australia

[*] Notice: The portion of the term of this patent subsequent to Aug. 2, 1994, has been disclaimed.

[21] Appl. No.: 748,316

[22] Filed: Dec. 7, 1976

Related U.S. Application Data

[63] Continuation-in-part of Ser. No. 493,570, Aug. 1, 1974, abandoned.

[51] Int. Cl.² .............................................. H01S 3/091
[52] U.S. Cl. .................................. 330/4.3; 331/94.5 P
[58] Field of Search ..................... 330/4.3; 331/94.5 P, 331/94.5 D

[56] References Cited

U.S. PATENT DOCUMENTS

| | | | |
|---|---|---|---|
| 3,424,991 | 1/1969 | Martin | 330/4.3 |
| 3,500,231 | 3/1970 | Tomiyasu et al. | 331/94.5 P |
| 3,810,041 | 5/1974 | Martin | 331/94.5 P |
| 3,986,130 | 10/1976 | Soures et al. | 330/4.3 |
| 4,006,431 | 2/1977 | Ross | 331/94.5 P |
| 4,039,962 | 8/1977 | Hughes | 330/4.3 |

FOREIGN PATENT DOCUMENTS

| | | | |
|---|---|---|---|
| 1514397 | 6/1969 | Fed. Rep. of Germany | 330/4.3 |
| 2019467 | 11/1970 | Fed. Rep. of Germany | 330/4.3 |
| 2105001 | 8/1971 | Fed. Rep. of Germany | 330/4.3 |

*Primary Examiner*—Nelson Moskowitz

[57] ABSTRACT

This invention relates to a laser amplifier system for amplifying a diverged laser beam to very high power levels, at constant flux density, over a very long optical path folded into a compact arrangement consisting of two rows of amplifier segments of progressively increasing diameter, the wide separation between each segment along the optical path being utilized to increase the self-oscillation of the system as a whole. The invention can also utilize only one row of amplifier segments with one or two rows of passive reflectors replacing the other row of amplifier segments, without changing its basic character. The invention is useful in thermonuclear reaction studies and optics studies.

8 Claims, 5 Drawing Figures

SYSTEM FOR AMPLIFYING LASER BEAMS

CROSS-REFERENCE TO RELATED APPLICATION

This is a continuation-in-part application of U.S. Pat. Application Ser. No. 493,570, filed Aug. 1, 1974 by John Leonard Hughes and now abandoned.

FIELD OF THE INVENTION

The invention relates to a system for amplifying laser beams to very high power levels using a folded, segmented amplifier, approximating the exponential form, in which each segment includes a suitably excited laser medium and a reflector which totally reflects the amplified laser beam and totally reflects the excitation radiation.

DESCRIPTION OF THE PRIOR ART

Prior art divergent beam amplifier systems constructed to date utilize laser medium segments in a straight line extending over lengths of several tens of meters. The expansion of the beam is accommodated by the insertion of collimators, i.e. beam-expanding telescopes, into the path of the laser beam. The self-oscillation of such prior art systems is prevented by the insertion of electro- and magneto-optic switches which are complex, expensive and limited to relatively small apertures.

Furthermore, prior art systems also include liquid dye cells for the suppression of self-oscillation effects but only at the cost to beam quality and beam intensity. Prior art systems do not include any system for the excitation of large aperture segments in such a manner as to suppress parasitic self-oscillations which terminate their amplifying capability. Prior art systems incorporating active mirror, parallel beam configurations have advanced to the stage where single segments have been tested and found to suffer from flashtube induced distortion of the mirror which in turn affects the quality of the laser beam being amplified. One of the major problems with prior art systems is the fact that the excitation radiation enters the laser medium through the mirror used to reflect the laser beam excitation sources positioned too close to the mirror. All prior art systems are limited to segment diameters of less than 20 cms and amplifying the laser beam at an *increasing* radiation loading per cm$^2$, rather than the *constant* radiation loading of the present invention.

BACKGROUND OF THE INVENTION

The advent of the laser (light amplification by the stimulated emission of radiation) in 1960 heralded a new era in scientific research because for the first time there became available a precisely controllable and very abundant source of photons, the quanta of radiation, which could be focussed into minute volumes ($<10^{-6}$ cm$^{-3}$) of space to produce very high radiation energy densities in excess of $10^{12}$ ergs cm$^{-3}$. However, many fundamental interactions involving photons, such as photon induced relativistic electrons, particle pairs and scattering events, require photon energy densities well in excess of $10^{12}$ ergs cm$^{-3}$, in fact, the most interesting interactions will require photon energy densities in the range $10^{20}$ to $10^{30}$ ergs cm$^{-3}$. It was soon realised during the early 1960s that major advances in laser technology would be required to achieve photon energy densities in excess of $10^{18}$ ergs cm$^{-3}$. One of the required major advances in the field came in the form of the exponential amplifier (Hughes Allied Optics Vol. 6, page 1411, August 1967) which utilized divergent beams rather than the highly collimated beams of prior art systems.

To achieve the highest possible photon energy density in focussed laser beams, as much laser output energy as possible should be concentrated within the focal region of the beam using the shortest possible laser pulse duration and the best possible focussing optics.

The amplification of such short ($<10^{-9}$ seconds) duration pulses of laser energy within the laser amplifying medium is given by the relationship, $$i = I_o e^{\alpha X} \tag{1}$$

where $I_o$ is the intensity of the pulse entering the amplifier and I the intensity of the pulse after it has travelled a distance X cms in the laser amplifier medium of gain $\alpha$cm$^{-1}$. It will be seen from relation (1) that there is an exponential increase in the intensity of the laser pulse undergoing amplification.

If this situation was allowed to continue the photon energy density cm$^{-2}$ of the pulse would soon exceed the destruction threshold of the amplifier medium. On the other hand, if the cross-sectional area of the amplifier was increased to accommodate the exponential increase of the pulse intensity, then it could be arranged that the pulse could be amplified at a constant flux density cm$^{-2}$ through the amplifier. Such a laser amplifier is referred to as an "Exponential" amplifier and its overall gain is given by $$\frac{\text{area of output aperture}}{\text{area of input aperture}} \tag{2}$$

It would be extremely difficult to construct an amplifier with exact exponential form so that its ideal characteristics can best be approximated to in practice by arranging a series of amplifying segments of increasing diameter in sequence. Such an approach is being followed in current high power laser systems although the rapid change to "Exponential" form has been somewhat suppressed by the fact that the larger diameter amplifier segments are limited to a circular beam diameter of about 20 cms due to parasitic self-oscillations within the segments which deplete their stored energy, accumulated over excitation pulse durations of 100 microseconds, prior to the arrival of the laser pulse to be amplified.

The power output of a laser amplifier can be approximated by the relationship, $$P = (eA/t) \text{ watts} \tag{3}$$

where e is the safe loading of the laser medium, or its container, in joules cm$^{-2}$, A the effective area of the output aperture in cm$^2$ and t the duration of the laser output pulse. For continuous wave outputs t will be taken to be one second.

A major difficulty with high power laser systems is to minimise the destructive effects, e.g. self-focussing or beam inhomogeneities for large e/t ratios. For example, in present high power rod-disc neodymium doped glass laser systems e values lie in the range 0.1 to 1 joules cm$^{-2}$ for t values ranging from $10^{-11}$ to $10^{-10}$ seconds, i.e. e/t values of between $10^9$ and $10^{10}$ watts cm$^{-2}$ as a relatively safe operating range. Above these values, a real possibility exists of the beam self-focussing into minute filaments with excessive radiation loadings or becoming distorted to such an extent that the laser output cannot be focussed into a well defined focus volume.

If the possibility of improving the e/t ratio is neglected then the way to higher powers must involve the use of multiple laser beams or a very large single beam. The difficulty with multiple laser beams is the fact that it is extremely difficult to superimpose the focus region of each beam to increase the photon flux density, the unique exception being the superposition of two oppositely directed laser beams into a common focus region to produce an optical "centre-of-mass" region, an essential prerequisite to conserve energy-momentum in fundamental photon-photon and photon-particle (antiparticle) interactions. However, techniques have been firmly established to form such "centre-of-mass" regions using a single beam laser but one with a multiple pulse output. Here the first pulse is delayed and stored behind the common focus region of the focussing optics in such a manner that it returns into the common focus region as the second pulse out of the single beam laser enters the focus region for the first time. In this way, the two pulses can be made to overlap forming the required optical "centre-of-mass" interaction region. (J. L. Hughes, Proceedings of the VII International Quantum Electronic Conference, Journal of Quantum Electronics, Vol. QE-8, No. 6, page 536, 1972).

The situation has now been reached in the development of high power lasers where the required increases in the peak power output P relies to a greater extent on increasing the output area A because it is becoming increasingly difficult to improve the radiation loading e and to shorten the pulse duration t. However, great care has to be exercised in ensuring that the laser beam quality is maintained as A is increased otherwise the destructive effects of the e/t ratio will be enhanced at relatively low flux density $cm^{-2}$ through the amplifier. Furthermore, as the aperture area A is increased, the parasitic self-oscillations in the segments or body of the amplifier segments must be suppressed otherwise it becomes pointless to increase A at all. This can be achieved by either selectively exciting the laser medium so that optimum excitation is attained in a period before the arrival of the laser pulse to be amplified, which of course must be less than the period required for the parasitic self-oscillations to build up to any significant level. Current technology does not allow the sequential excitation of laser amplifiers with large A values, i.e. greater than about 20 cm in beam diameter, because the sources for rapid excitation, i.e. photo-emitting diodes and particle beams cannot be economically justified on such a large scale at present. This mode of laser excitation is referred to as space sequential excitation to distinguish it from time sequential excitation. In time sequential excitation, the amplifier medium is brought up to near parasitic self-oscillation threshold with conventional excitation sources such as flashtubes or particle beam initiated discharges then rapidly excited in a period between 1 to 1000 nanoseconds ($10^{-9}$ to $10^{-6}$ seconds) well above self-oscillation threshold with relatively very high efficiency (1% to 50%) so that the laser pulse could be amplified well before the parasitic self-oscillations set in. The large A valve output sections of high power laser systems can be successfully operated in this manner.

Another serious problem with the operation of high power laser systems is the fact that the spontaneous decay radiation, present to some extent in all excited laser media can also lead to parasitic self-oscillations of the laser system as a whole, i.e. along the axis of beam propogation rather than transverse to it as was the case discussed above for self-oscillations of large individual segments of such an amplifier. There are two basic approaches to the suppression of this axial self-oscillation of the laser system as a whole. Firstly, one can include very complex and expensive electro-optic, magneto-optic, switches into the path of the laser beam which are activated for a relatively short period to allow the passage of the laser pulse but suppress as much as possible the passage of the spontaneous radiation generated at the same wavelength as the laser pulse within the activated laser amplifier medium. However, it has to be stressed that the inclusion of any components in addition to the amplifier segments into the path of the laser beam will be detrimental to the laser system as a whole. A second, less costly in terms of component costs, and a passive version of the above switches is the self activity chemical dye switches. However, all these devices affect the quality of the laser beam and only the dye cell switch can be used with very large amplifier apertures A. Furthermore, the inclusion of large diameter dye cells in the path of the laser beam both reduces its intensity and also distorts its quality because it would be virtually impossible to guarantee high homogeneity of the liquid dye due to thermal gradient effects within the liquid dye medium.

A more subtle approach to the suppression of the spontaneous radiation along the length of the laser amplifier system is to utilize the fundamental difference between the spontaneous decay radiation and the coherent laser radiation, namely the fact that the latter is highly directional. Therefore, if the segments of the amplifier are well separated, there will be no loss of laser beam radiation but a drastic loss of the isotropically emitted spontaneous radiation. If we select a particular segment in the amplifier chain with, for example, $A \sim 10^4 cm^2$, then the segments before and after it in the chain at a distance R cm will emit spontaneous decay radiation isotropically, i.e. over 2 radians so that a fraction $A/2\pi R^2$ falls on the particular segment under consideration from each of its neighbouring segments, i.e. a total of about $A/\pi R^2$ of the emitted spontaneous decay radiation. There will therefore be a loss of spontaneous decay radiation of about $8 \times 10^3$ with $A = 10^4 cm^2$ and $R = 5000$ cm.

SUMMARY OF THE INVENTION

It is an object of the present invention to achieve a very long amplification path in a relatively compact laser amplifier configuration such that the laser beam is amplified over approximately the same range of intensity $cm^{-2}$ in each segment of the amplifier.

Another object of the invention is to achieve a very large diameter, high quality, ultra high power output beam using the natural divergence of the beam through the amplifier.

A further object of the invention is to achieve a double pass amplification in each segment of the amplifier.

A still further object is to achieve a double, double pass amplification of the laser beam in each segment.

Another object of the invention is to achieve a large separation between two rows of segments, or one row of segments and one of passive reflectors, forming the amplifier configurations leading to a relatively high threshold for self-oscillation along the amplification path.

Another object of the invention is to provide means of excitation of the segments such that the attached reflector is not significantly distorted, yet the segment can be operated well above the normal threshold for parasitic self-oscillation.

Yet another object of the invention is to utilize the mirror in each segment to partially or wholly reflect the excitation radiation.

The invention provides a system for amplifying a high quality laser beam to very high power levels, thereby allowing up to four times the amplification efficiency of a single pass system, comprising means for directing a laser beam onto the input surface of a first laser medium segment of a plurality of laser media segments, either directly or via reflection off one or more mirrors. The said laser media segments being located in a compact arrangement, each said laser medium segment being provided with means to reflect the laser beam onto the input surface of the next laser medium segment, either directly or via one or more mirrors, the input surface of each said laser medium being provided with an anti-reflection coating, where necessary, to lessen spurious reflections, and each said laser medium segment having associated with it excitation means for exciting the laser media wherein the beam is successively and progressively increased in size and power.

The laser media segments are excited either with flashtubes and/or photo-emitting diodes. The initiation of the flashtube and/or photo-emitting diode excitation may be at the same instant of time or delayed with respect to each other so that the laser media segments can be excited to just below their parasitic self-oscillation threshold with the flashtube excitation and then rapidly excited above this parasitic self-oscillation threshold with the photo-emitting diode arrays. Each of the photo-emitting diode stacks can be fired at the same time or in a predetermined sequence to ensure a minimum amount of the parasitic self-oscillations within the laser media segments.

As previously mentioned, a particular advantage of a folded laser amplifier is the fact that the segments of the amplifier, which in this invention will be of increasing dimensions to accommodate the divergent beam, can be well spaced out yet retain a reasonable compactness for the system as a whole. If self-focussing of the beam does take place in such a system then it will not lead to damage in more than one segment, if at all, because the beam will either have diffused long before it strikes the next segment, which, in a typical layout could be tens of meters away, or will not have sufficient thickness of segment to complete the self-focussing process. The well-spaced-out segments will also allow for the natural divergence of the laser beam through the folded amplifier over a very long total path. For example, a 50 meters separation between the two rows of segments forming the folded structure of the present invention, together with 10 traverses would give a total amplifier length of over 500 meters in a relatively compact area. Furthermore, one of the rows need only contain passive reflectors so that all the power supplies can be concentrated along only one of the two rows of optical components.

Unfortunately, fringe structure appears in laser beams as they traverse dense optical media. Such a fringe structure can be composed of a concentric ring pattern which leads to a severe deterioration of beam quality. It is possible to extract only the central portion of such a structured beam using evacuated spatial filters, a well known state of the art technique. However, with very large laser beam diameters as appropriate to the present invention, it would be preferable to use any medium which could compensate for the beam distortions. Such techniques are now being developed with state of the art and will obliviate the more conventional techniques for beam cleaning such as evacuated hard aperture systems.

Very large discs or slabs of solid laser media, as appropriate to the present invention, will, in general have a much greater diameter than thickness so that they have to be faced-pumped, i.e. excited via their end surfaces. On the other hand, the cost of such large optical segments is so high that the beam has to be reflected from one row to the other via mirrors attached to the laser medium itself. This leads to a disadvantage in high power laser systems in that the laser pulse has to be reflected back on itself within the laser medium thus increasing the photon flux density well above the single beam value. To remove the reflector away from the segment so that the pulse overlap occurs between the surface of the segment and that of the mirror would imply that the substrate of the mirror would have to be the same dimensions and optical quality as the amplifying segment itself. In the present invention it is anticipated that costs of installing separate reflectors will require the mirrors to be deposited directly onto the rear surface of the laser amplifier medium in the manner used with the first ruby laser save that in the present invention only one face of the amplifier medium has the mirror attached, and the ratio of surface area to thickness of medium is very large. Great care must be exercised during the excitation of the medium in the present invention otherwise the mirror attached to the segment can be distorted, a defect which in turn will distort the laser beam undergoing amplification. One of the greatest sources of distortion in active mirror systems is the shock waves generated by the flashtubes. Such devices are positioned close to the mirror to ensure the highest possible excitation efficiency of the segment. In this invention the excitation of the laser medium is not through the mirror as in prior art systems. Furthermore, the mirror which reflects the laser beam should also be capable of reflecting the excitation radiation, at least that portion of it which matches the absorption bands of the amplifier medium.

BRIEF DESCRIPTION OF THE SEVERAL VIEWS OF THE DRAWINGS

A better understanding of the invention will be gained from the following description taken in conjunction with the accompanying drawings. It is emphasised that the ensuing teachings are exemplary and not limitative of the scope and applicability of the invention.

In the drawings.

DETAILED DESCRIPTION

Figure 1:
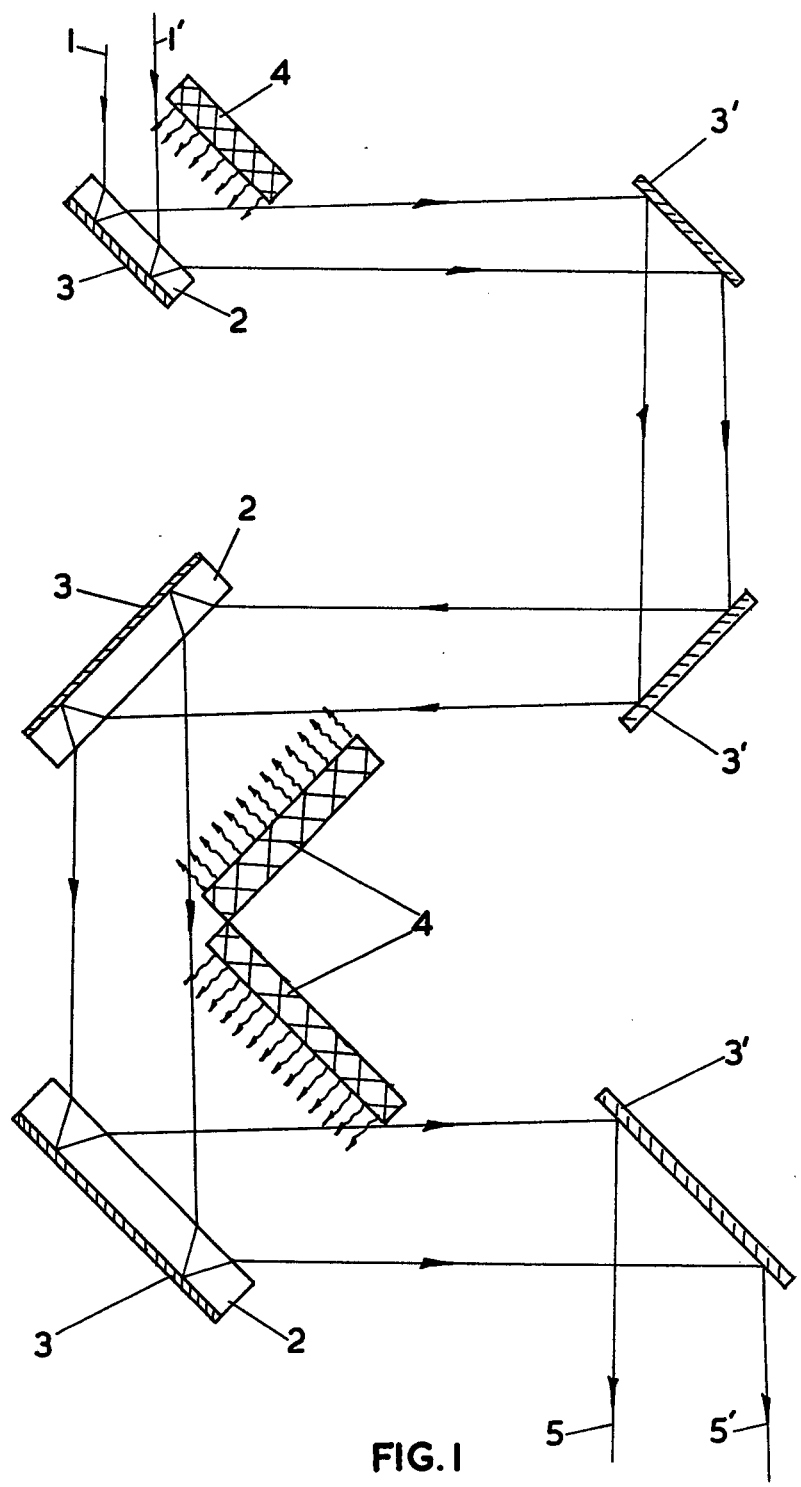
FIG. 1 is a schematic layout of a preferred system for amplification of the laser radiation to very high power levels using two unit segments along one of the rows and passive reflectors along the other, with the excitation source for each segment being arranged to excite the laser medium from the side in which the laser beam is incident.

Now having particular regard to the numerals on the drawings, 1 and $1^1$ define an input laser beam (generated in a manner known per se). Numeral 2 indicates the laser medium which may be disc or else the slab configuration of the type described in U.S. Pat. No. 3,928,811 granted 23 Dec. 1975. Numeral 3 represents a dielectric or metallic mirror attached to or deposited onto one of the end surfaces of laser medium 2. (Note, on each of the input surfaces of the laser media there is an anti-reflection coating (not shown) to reduce spurious reflection from the laser beam where needed.) Numeral 4 represents the excitation radiation source for the laser medium 2, e.g. arrays of flashtubes and/or photo-emitting diodes. Numerals 5, $5^1$ define the laser output beam. 1, $1^1$ is much smaller than 5, $5^1$ in size and peak power, but comparable in terms of power density per unit area.

As viewed horizontally, i.e. from left to right, the distance between adjacent 2's can be very long, e.g. of the order of tens of meters, whilst viewed vertically, i.e. from an upper 2 to the adjacent lower 2 (these constitute a two unit segment), the distances are several beam dimensions.

In a particular case the input beam 1, $1^1$ may be of circular cross-section and between 5 and 10 cm. diameter, the distance between horizontal 2's as set out above say 10 meters and the distance between the vertical 2's about 0.5 meters to about 10 meters. The output beam 5, $5^1$ is then about 20 cm. to several meters in diameter.

As shown in FIG. 1, the laser beam is reflected through 180° using two reflectors orientated at approximately 45° in this instance. During this 180° reflection process the laser beam passes twice through each of the two units forming the amplifier segment of this configuration. The excitation source 4 may be either an array of flashtubes, a mixture of flashtubes and photo-emitting diode arrays or photo-emitting diode arrays only. In general, the source of excitation radiation may be any source of radiation suitable for the excitation of the laser medium either below or above the threshold for parasitic self-oscillation within the amplifier medium whatever the threshold level for this effect may be. Excitation radiation from sources 4 may be spread over a very narrow band of wavelengths matching the absorption bands of the laser amplifier medium 2, or spread over a very large band of wavelengths or be emitted in a combination of wide and narrow band of wavelengths, the narrow bands matching the absorption bands of the amplifier medium 2. Sources 4 may be pulsed together or in any such sequence that would increase the parasitic self-oscillation threshold in the so excited laser medium 2.

The excitation source 4 is arranged in such a position relative to the amplifying medium 2 that the part of the total excitation radiation not absorbed in the laser amplifier medium on the first pass through it is reflected by the reflector 3 to traverse the medium in the opposite direction thus effectively doubling the absorption length of the amplifying medium.

Figure 2:
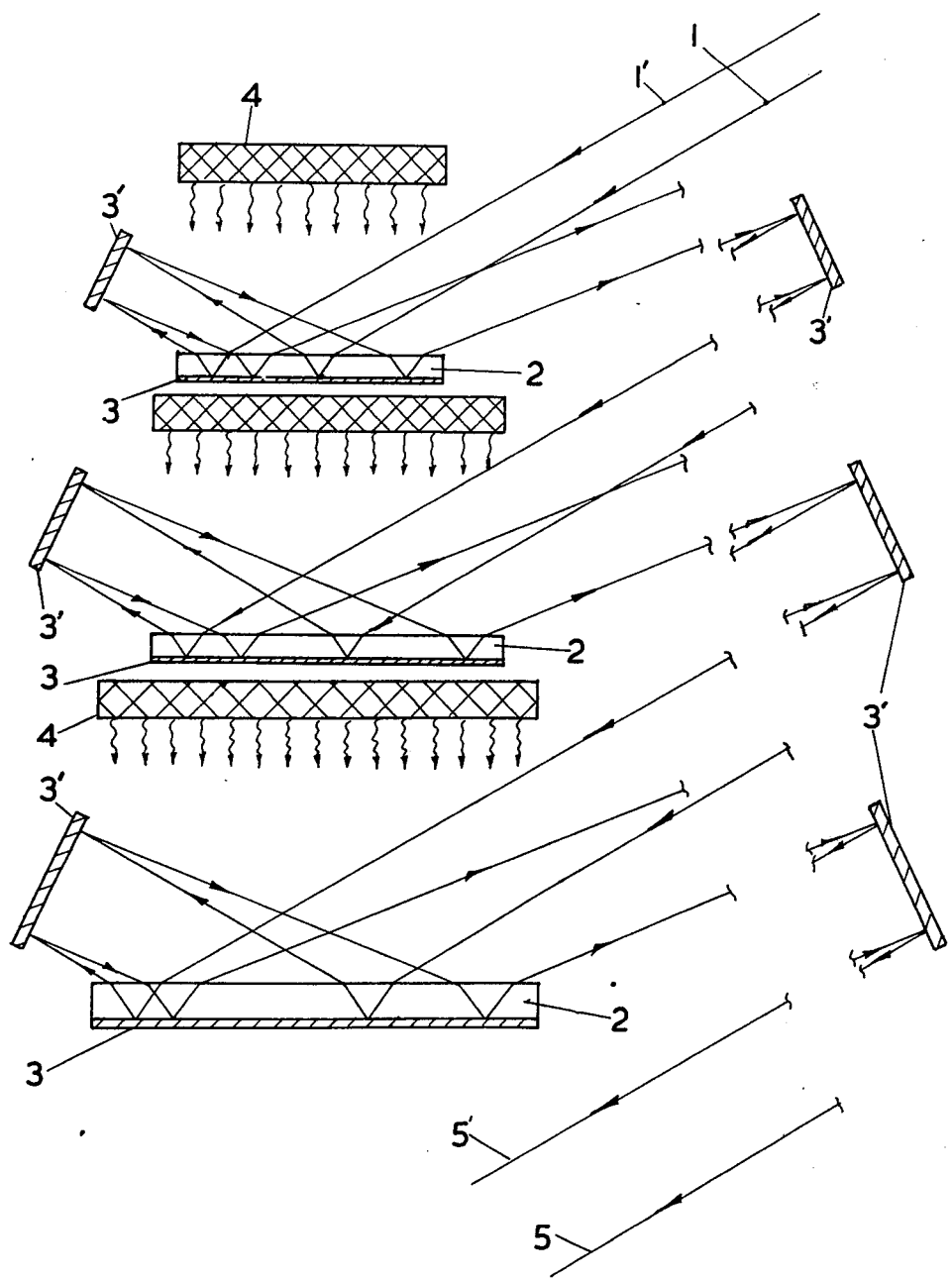
FIG. 2 is a schematic layout of a preferred system for amplification of laser radiation to very high power levels using techniques to double the operating efficiency of the segments compared with those of FIG. 1. Furthermore, there are now two rows composed of passive reflectors, one on either side of the central row of amplifier segments.

FIG. 2 is a schematic layout showing a configuration of the present invention which can double the efficiency of the configuration shown in FIG. 1. The laser medium is now a single unit segment of the amplifier orientated at Brewster angle with respect to the incident and refracted laser beams. The incident beam 1, $1^1$ is refracted and reflected by medium 2 and reflector 3 respectively and directed onto the reflector 3' which is slightly tilted in such a manner as to reflect the incident beam at a slight angle to the incident beam such that there is complete separation from the beam 1, 1' before reflector 3' which in turn reflects the beam back to the second amplifier segment, positioned below the first, where the same process is repeated. The separation of reflector 3' from the laser medium 2 must be such as to allow time for excitation radiation from source 4 to replenish stored amplifier energy extracted by the pulse on its first double pass through 2. In this manner the laser pulse traverses the amplifier medium under optimum amplifying conditions.

Figure 3:
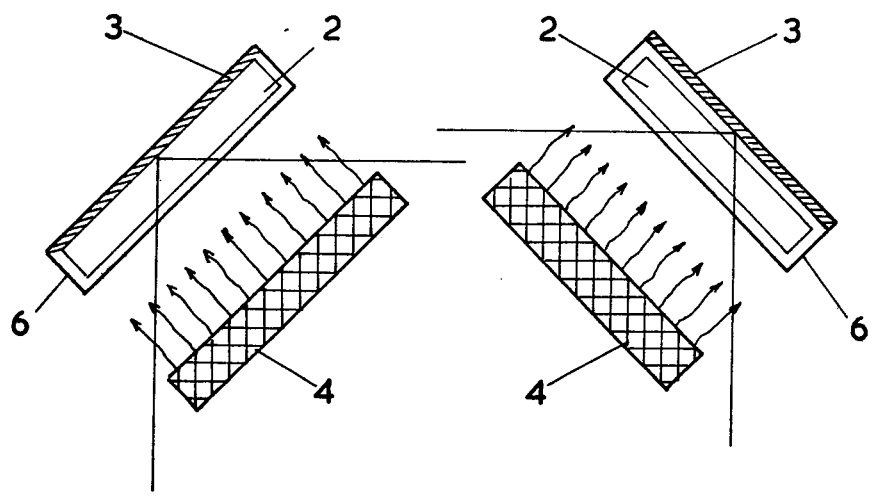
FIG. 3 is a schematic layout showing details of segment units with the solid amplifier medium replaced by a container of similar dimensions which acts as a container for a gaseous or liquid laser medium.

Turning now to FIG. 3, 2' is a gaseous or liquid laser medium or a solid laser medium requiring support. The medium may be iodine. 6 is a container or support transparent to the laser and excitation beams. The container may be elliptical in cross section.

The anti-reflection coating on the input/output surface of the amplifier media in FIGS. 1 and 2 must be highly transparent to both the laser and the excitation radiation. In the latter case, the anti-reflection coating need only be transparent to that portion of the wavelength bands of the excitation radiation which match the absorption band or bands of the amplifying medium. Naturally both the front and rear surfaces of the amplifying medium are optically polished to a standard required for high laser beam quality.

Figure 4:
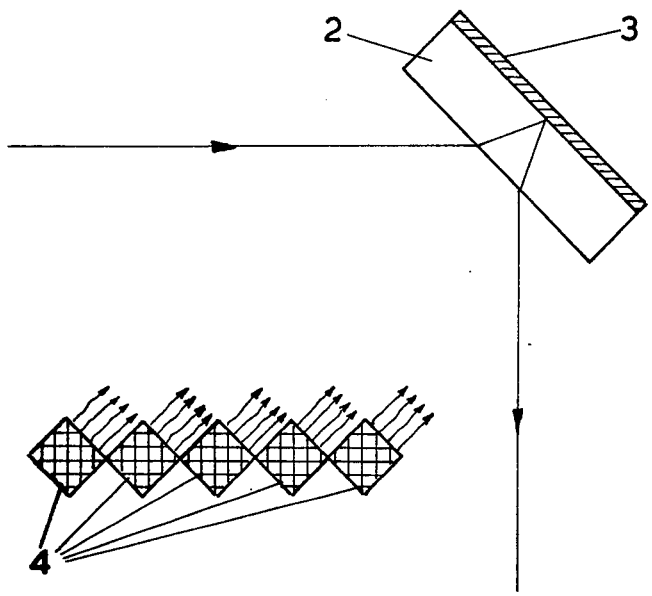
FIG. 4 is a schematic layout of a preferred system for sequentially exciting the laser medium segment to suppress the onset of parasitic self-oscillations prior to the arrival of the laser pulse to the amplified.

FIG. 4 is a schematic layout showing means to sequentially excite the amplifier media 2 and 2' so as to increase the parasitic self-oscillation threshold. Each array of light sources must be operated in a period comparable to the time that it takes for light to travel across an internal diameter of the amplifying medium 2. If the large discs facing amplifying medium 2 are one meter or more in length then it will take light at least $9 \times 10^{-9}$ seconds to traverse such a medium crossing its refractive index in about 1.5. Therefore, if all of the excitation source arrays shown in FIG. 4 were triggered simultaneously, they would have to be switched so that one side was about 1.5 meters ahead or behind the other. In this way it could be arranged that the excitation of the segment unit was completed just before the arrival of the last portion of the laser beam to be amplified, bearing in mind that the amplifying medium 2 is tilted relative to the direction of propogation of the laser beam. The arrangement in FIG. 4 provides many combinations for the sequential excitation of the laser medium 2 by the excitation sources 4'.

Figure 5:
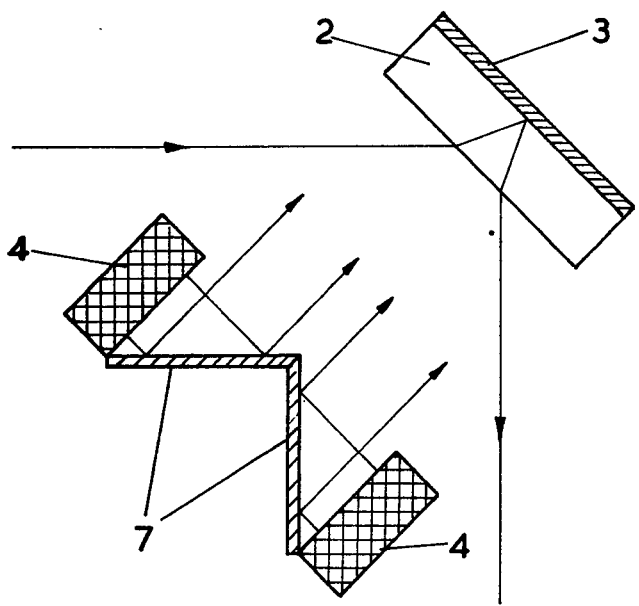
FIG. 5 shows another configuration of the exciter, one involving the reflection of the excitation before it enters the amplifier medium segment.

FIG. 5 shows another schematic layout of a segment unit of the present invention where the light from the excitation source 4 is reflected off reflector 7 before entering the laser amplifier medium 2. Only the cross-section of the segment unit is shown so that the sources 4 could be arranged around a circular, square, rectangular or similar arrangement around the coaxial reflector 7. Here again the source 4 can be pulsed as a whole or in part.

Finally, it should be noted that the surfaces of the mirror 3 and laser medium 2 need not be parallel to each other. The mirror 3 may be deposited on or attached to laser medium 2. If the mirror is attached, then the laser pulse will overlap inside the amplifier medium 2. If the mirror is separated from the medium 2 by the length of the laser pulse, then no pulse overlap need occur inside the medium 2. However, this is only time for short duration pulses, i.e. $< - 10^{-9}$ seconds duration. Otherwise the beam cannot clear the edges of medium 2 on its return passage.

FIG. 2 would operate most efficiently when the angle between the beams on either side of the amplifier segments is small. This implies that the separation between the amplifier segments must be as large as possible consistent with the divergence of the excitation radiation or particle beams. When this angle between the beams is small, the volume of the amplifier segment utilized by each of the beams tends to become identical. On the other hand, if the angle between the beams incident in any particular segment is large as indicated in FIG. 2, then each beam sweeps out an additional volume of the segment thus not only demanding much larger segments in the amplifier but reducing its overall efficiency.

A particular use for the present invention is in laser controlled thermonuclear reaction studies and in laser apparatus for non-linear optics studies.

Industrial applications are in fields which require high quality, high power laser beams such as precision welding and cutting of metal components. The optical power output from the invention can also be utilized in laser fusion studies and also X-ray laser techniques.

Modifications may be made within the above described subject matter without departing from the spirit and scope of the invention.

I claim:
1. A uni-directional laser amplifier system utilizing a diverged, laser beam whose diameter exceeds twenty cm., composed of either a single, unstructured pulse, or a train of such pulses, amplified to a level in excess of one terrawatt peak power over folded amplification path of at least fifty meters emerging via an elliptical cross-section aperture, whose major axis exceeds twenty centimeters the system comprising:
    (a) two rows spaced at least ten meters apart of amplifying segments of elliptical and progressively increasing cross-sectional area each segment possessing two optically polished, non-parallel, flat end surfaces with the front surface of each segment being anti-reflection coated and its rear surface having either a mirror deposited on it which reflects the laser beam and segment excitation radiation 100% or having the same mirror attached to it and/or separated from the rear surface of the segment by at least half the length of the laser pulse to be amplified so that no pulse overlap occurs in the amplifying medium;
    (b) each segment orientated at an angle of approximately 45° to the length of its row and at an angle of about 90° to the segment which follows or precedes it in the amplifying sequence so that any pair of segments in the row with their front faces facing each other will reflect the diverged beam traversing the amplifier through a total angle of about 180° the beam traversing each segment twice during this process so that it emerges travelling approximately parallel to its path of incident but in the opposite direction and displaced by at least its own diameter in such a manner that it can traverse all remaining segments of the amplifier system;
    (c) optical excitation sources for sequential excitation of amplifying segments positioned between the two rows of segments such that each source is positioned parallel to the input surface of its respective segment, at such a distance as not to interfere with the laser beam path, so that its output radiation enters the amplifier segment where it can be partially (or wholly) absorbed and the remainder is wholly reflected by the mirror deposited on the rear surface of the segment so as to increase its absorption efficiency in the laser medium.

2. A laser amplifier system as claimed in claim 1 where the diameter of the output beam is up to twenty times larger than the diameter of the input beam thus giving an overall gain of 400.

3. A laser amplifier system as claimed in claim 1 where the excitation source is composed of flashtubes and photo-emitting, diode arrays.

4. A laser amplifier system as claimed in claim 1 where the amplifying medium is neodymium doped glass.

5. A laser amplifier system as claimed in claim 1 where the laser medium is iodine contained in containers of elliptical cross-sections whose outside dimensions approximate those of the corresponding solid segments.

6. A laser amplifier system according to claim 1, wherein the excitation source is composed of photo-emitting diode arrays.

7. A laser amplifier system according to claim 1, wherein the optical excitation sources are triggered simultaneously and positioned so that the sequential excitation segments take place along the major axes.

8. A laser amplifier system according to claim 1, wherein the optical excitation sources are triggered sequentially and positioned so that the sequential excitation segments take place along the major axes.

* * * * *